United States Patent [19]

Ennis et al.

[11] Patent Number: 4,754,515

[45] Date of Patent: Jul. 5, 1988

[54] VEHICLE WASHING SYSTEM HAVING A CONTOUR-FOLLOWING BRUSH WITH A BRUSH ROTATIONAL AXIS DEFLECTABLE IN BOTH HORIZONTAL AND VERTICAL PLANES

[75] Inventors: G. Thomas Ennis, Playa Del Rey; Paul N. Wickstrom, El Toro, both of Calif.

[73] Assignee: N/S Corporation, Inglewood, Calif.

[21] Appl. No.: 894,824

[22] Filed: Aug. 8, 1986

[51] Int. Cl.$^4$ .............................................. B60S 3/06
[52] U.S. Cl. .................................. 15/53 AB; 15/97 B; 15/DIG. 2
[58] Field of Search ........... 15/53 A, 53 AB, DIG. 2, 15/97 B

[56] References Cited

U.S. PATENT DOCUMENTS

| | | | |
|---|---|---|---|
| 3,626,537 | 12/1971 | Wilson | 15/53 AB |
| 3,931,660 | 1/1976 | Capra | 15/53 AB |
| 4,513,467 | 4/1985 | Roncaglione | 15/53 AB |

FOREIGN PATENT DOCUMENTS 2006596 12/1969 France ........................... 15/DIG. 2

*Primary Examiner*—Edward L. Roberts
*Attorney, Agent, or Firm*—Cahill, Sutton & Thomas

[57] ABSTRACT

A vehicle washing system washes the horizontal, vertical or inclined surfaces of a vehicle driven along a path. The system includes a brush assembly having a brush and a drive system for rotating the brush about the rotational axis of the brush. A brush assembly pivot point is located at an intermediate position along the length of the brush assembly. A brush assembly suspension system enables the brush assembly to be angularly deflected in both vertical and horizontal planes and includes a vertical support element which is positioned in proximity to the vehicle path and a brush assembly standoff unit which pivotally couples the brush assembly to the vertical support element at a predetermined elevation. The brush assembly standoff unit includes a horizontal pivot unit and vertical pivot means. The horizontal pivot unit pivotally couples a first section of the standoff unit to the vertical support element to permit angular deflection of the standoff unit with respect to the vertical support element in a substantially horizontal plane. The vertical pivot unit is spaced apart from the horizontal pivot unit and pivotally couples a second section of the standoff unit to the brush assembly pivot point to permit angular deflection of the brush assembly with respect to the vertical support element within a substantially vertical plane. The rotational axis of the brush is deflected in both the vertical and horizontal planes in response to relative movement between the vehicle and the system to maintain a firm but yieldable contact between the rotating brush and the vehicle.

16 Claims, 8 Drawing Sheets

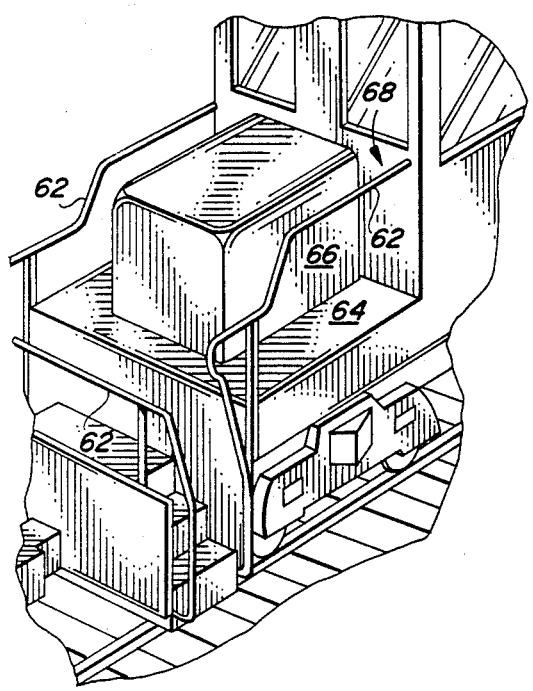
FIG.-2
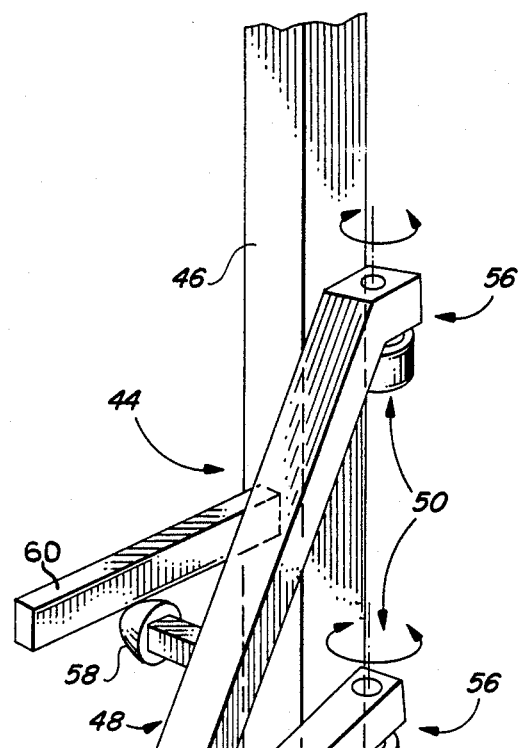
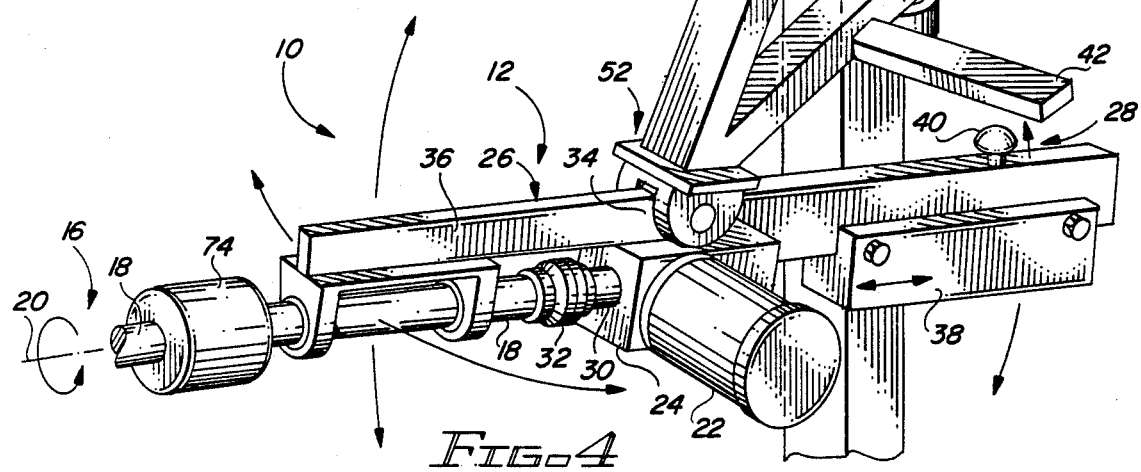
FIG.-4
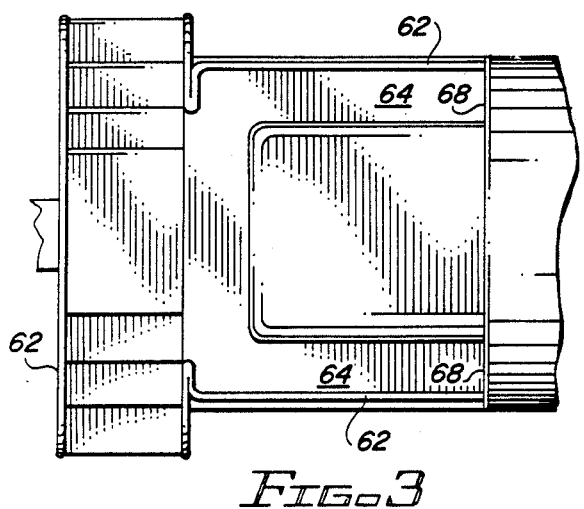
FIG.-3
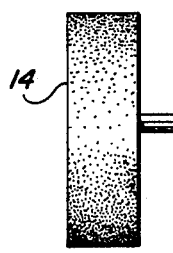
FIG.-5A
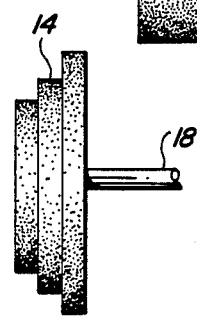
FIG.-5B
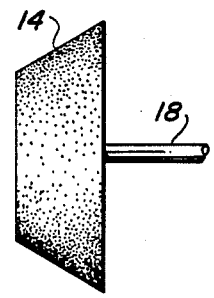
FIG.-5C

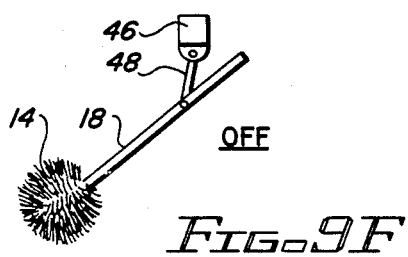
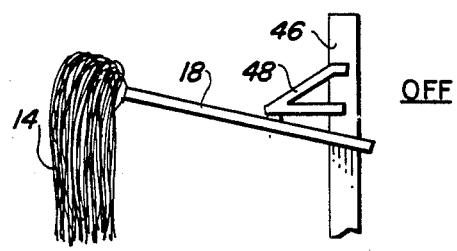
FIG-9F
FIG-10F
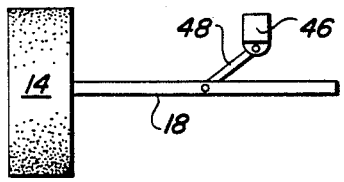
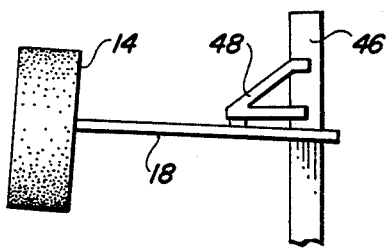
FIG-9G
FIG-10G
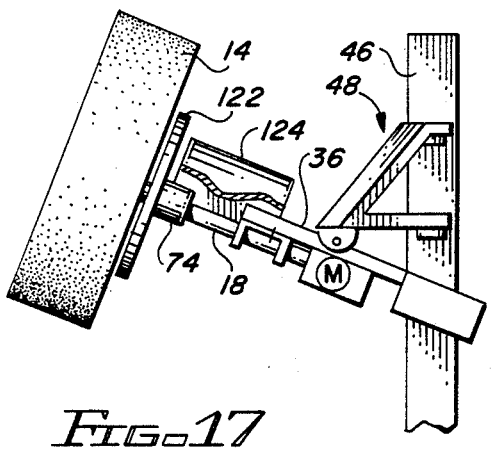
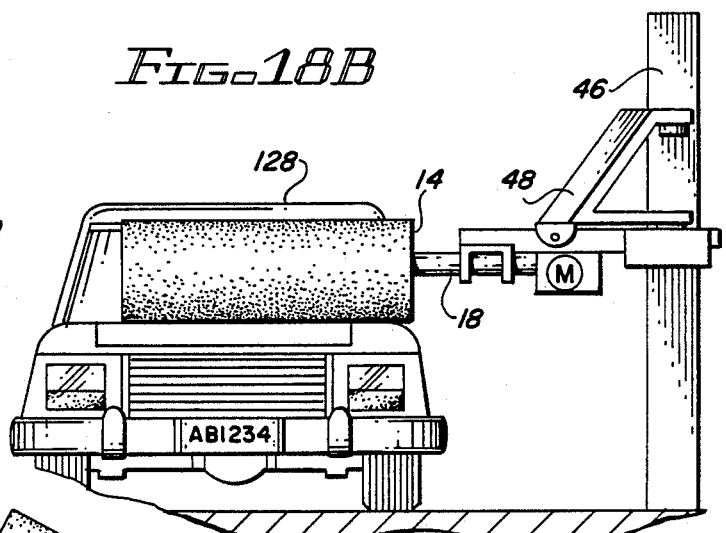
FIG-17
FIG-18B
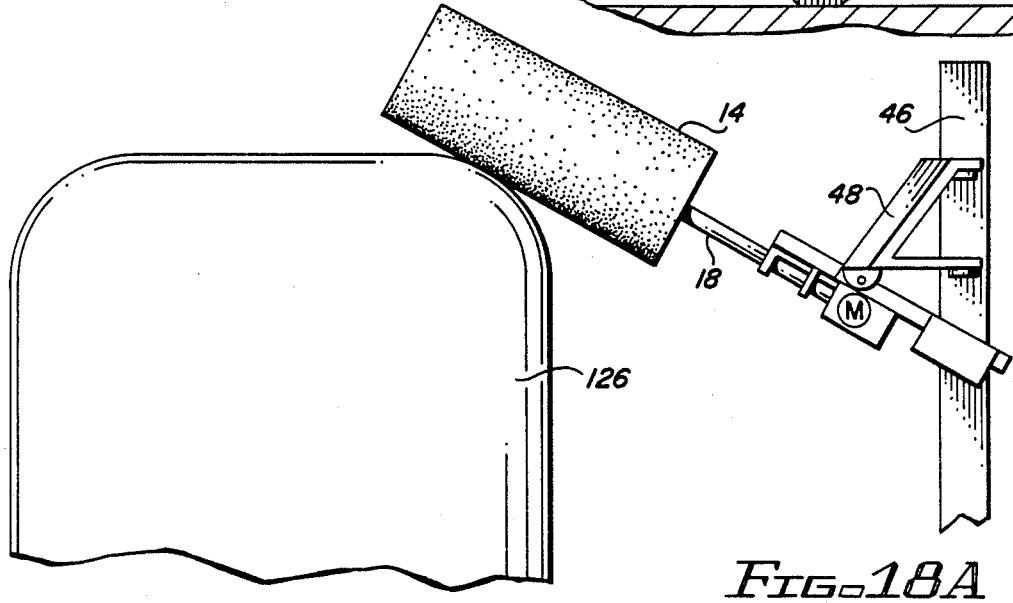
FIG-18A

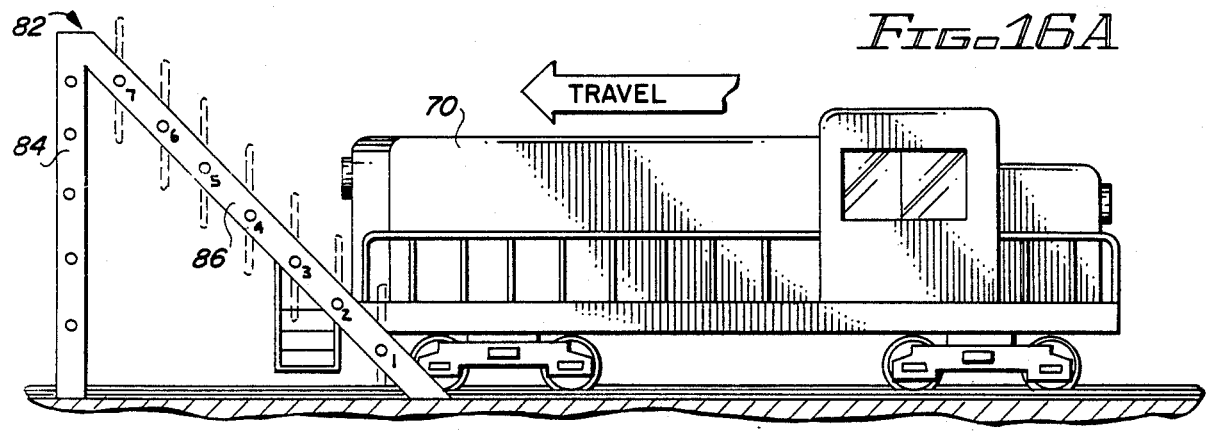
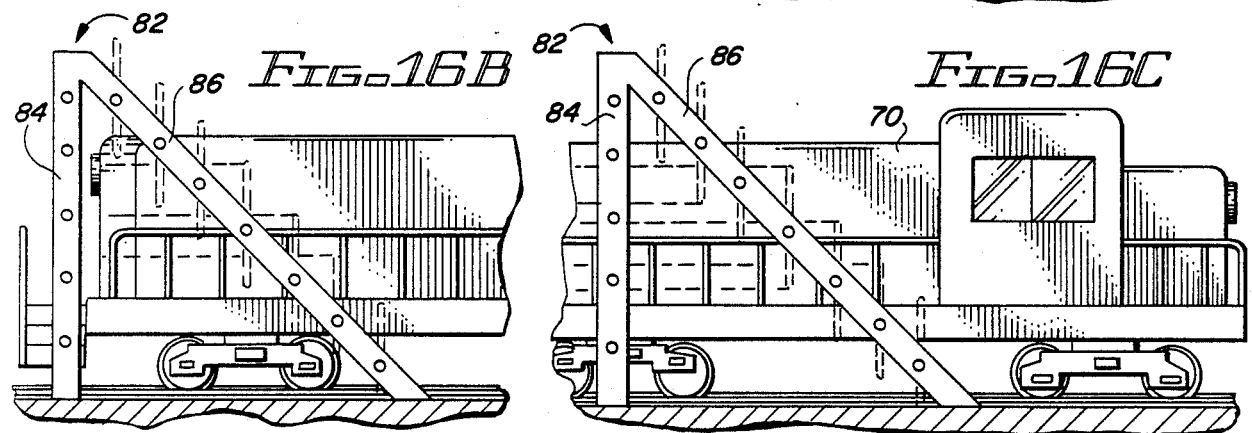
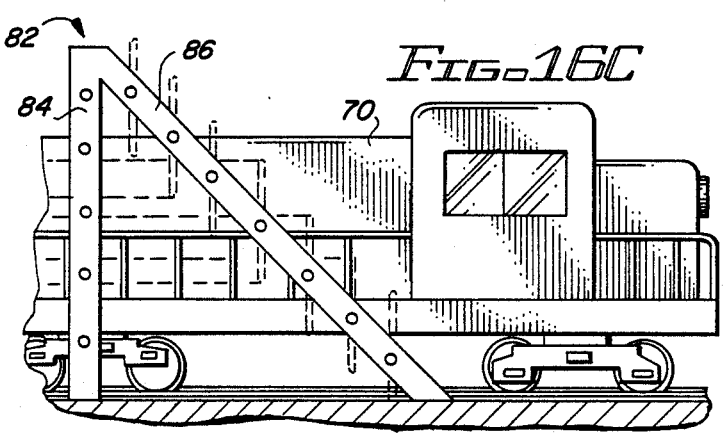
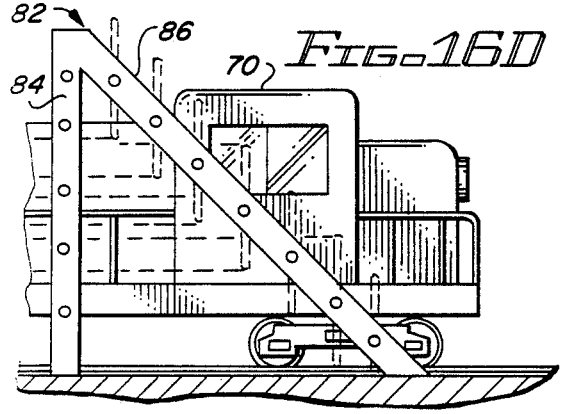
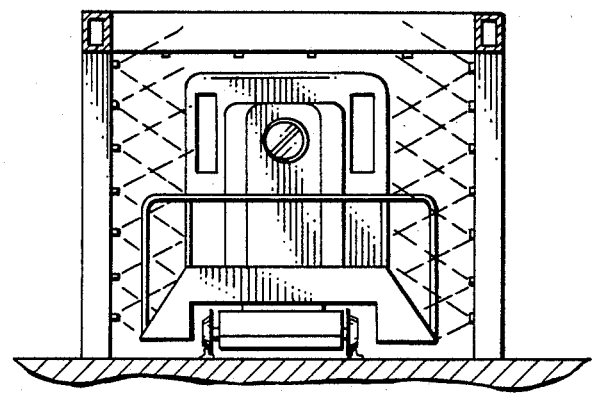
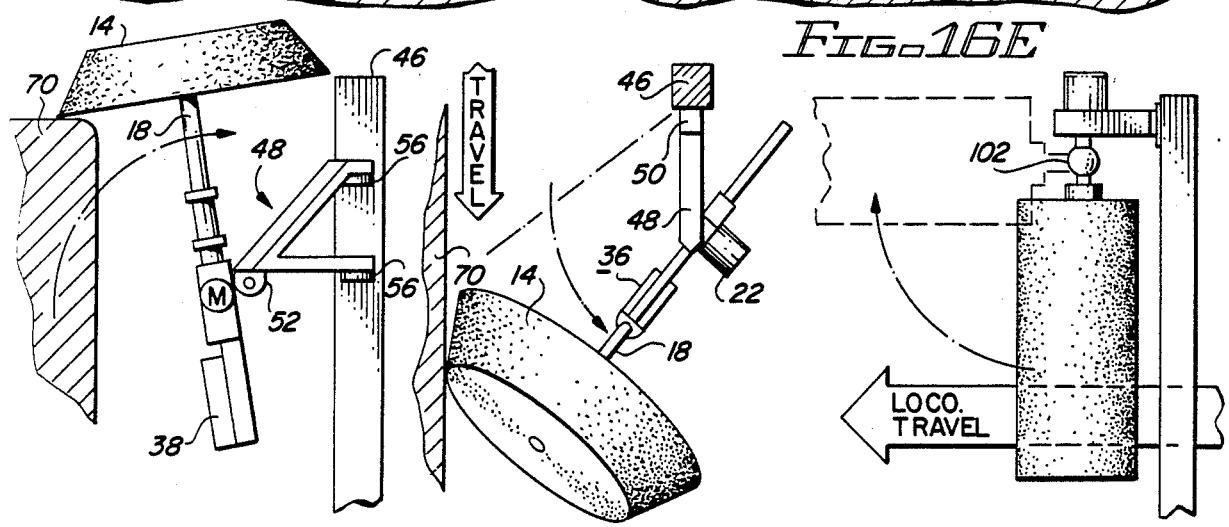
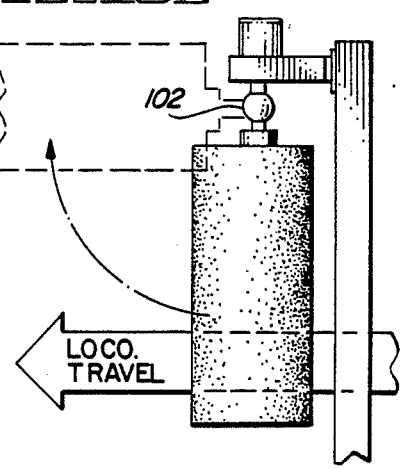

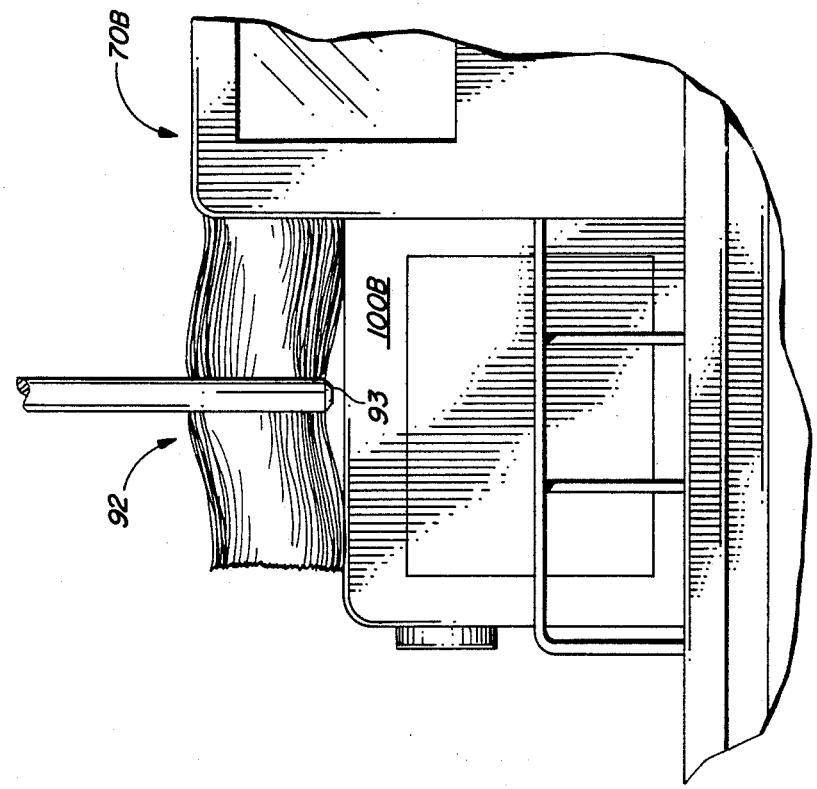
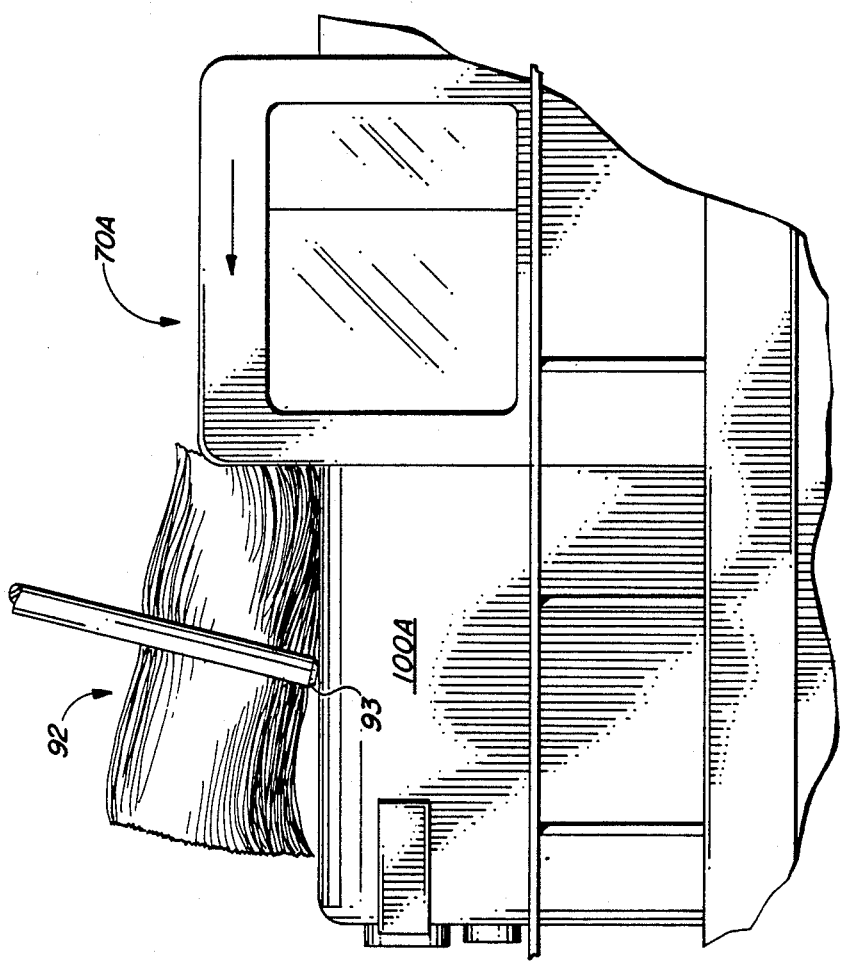

VEHICLE WASHING SYSTEM HAVING A CONTOUR-FOLLOWING BRUSH WITH A BRUSH ROTATIONAL AXIS DEFLECTABLE IN BOTH HORIZONTAL AND VERTICAL PLANES

BACKGROUND OF THE INVENTION

1. Field of the Invention

This invention relates to vehicle washing systems, and more particularly, to vehicle washing systems having a brush with a rotational axis which can be deflected in both vertical and horizontal planes to wash either vertical or horizontal surfaces positioned on the opposite side of a vertically extending obstruction or a horizontal surface positioned in alignment with a vertical surface.

2. Description of the Prior Art

For years diesel locomotives have been hard to keep clean. Such locomotives are operated on a nearly-continuous basis and are exposed to dirt, grease, oil and diesel fumes. As a result, diesel locomotives must be cleaned frequently for maintenance and safety reasons and also to assist the railroads that own such locomotives in maintaining an appropriate public image.

A substantial percentage of the exterior surface area of a diesel locomotive is surrounded by a vertically extending obstruction in the form of a handrail. Behind this handrail lies a horizontally oriented walkway and a vertically extending side surface oriented either parallel or perpendicular to the locomotive's direction of travel. Although prior art vehicle washing systems of the type typically used to clean cars, trucks and vans could access and clean selected portions of a locomotive, such prior art systems are not able to clean the extensive locomotive surface area lying behind the locomotive handrails.

To solve the difficult problem of cleaning diesel locomotives without reliance on expensive hand washing techniques, railroads have adopted spray systems for directing sprays of strong chemicals, detergents and wash water against the exterior surfaces of a locomotive. Such fluid sprays are not hindered by the comparatively open structure of the handrails and are therefore able to direct fluid streams against the vertical side surfaces and horizontal walkways lying on the interior of the locomotive handrails.

Unfortunately, such high pressure spray cleaning systems have failed to adequately clean locomotives and utilize large volumes of cleaning chemicals as well as large volumes of water. To achieve the massive fluid flow and pressure requirements of such prior art spray cleaning systems, expensive, large capacity pumps driven by powerful electric motors must be incorporated in such systems.

Because the spray cleaning systems described above do not provide the mechanical brush-to-locomotive surface cleaning action of the type available with conventional rotating brush vehicle washing systems, such spray cleaning systems have failed to provide a satisfactory solution to the locomotive cleaning problem.

Cleaning the surface area located inside the bed of a pick-up truck presents a problem analogous to that explained above in connection with locomotives. In a pick-up truck, the truck bed and vertically extending surfaces in the form of the sides of the pick-up truck bed, the tail gate and the rear surface of the truck cab cannot be cleaned by conventional vehicle washing systems incorporating rotating cleaning brushes. Such prior art systems are capable of cleaning the front, sides and rear of pick-up trucks as well as the hood, windshield and cab top, but cannot access the interior surfaces of the pick-up Although it is conceivable that a highly complex vehicle washing system incorporating a rotating cleaning brush could be directed by a robotic system or by other complex hydraulic or pneumatic control systems, the cost of such systems would be prohibitive. In addition, such systems might not be fail safe. That is, if a vehicle were driven past such a complex vehicle washing system at an excessive rate of speed, it is likely that the control system could not react in a sufficiently short time to move itself out of the way to avoid substantial system damage or vehicle damage.

SUMMARY OF THE INVENTION

It is therefore a primary object of the present invention to provide a vehicle washing system having a contour-following rotating brush which relies only on (1) brush to vehicle rotary reaction forces, (2) forces generated by the relative movement of a vehicle with respect to the system, and (3) gravity to cause the brush to position itself within an area lying on the opposite side of a vertically extending obstruction, to clean the surfaces lying within that area and to automatically extract itself from that area at the appropriate time.

Another object of the present invention is to provide a vehicle washing system having a contour-following rotating brush which contacts and provides mechanical brush to vehicle cleaning action on surfaces lying on the opposite side of a vertically extending obstruction.

Yet another object of the present invention is to provide a vehicle washing system having a contour-following rotating brush which accomplishes complex, three dimensional brush repositioning deflections without relying upon active control systems energized by pneumatic, hydraulic or electric control actuators.

Still another object of the present invention is to provide a vehicle washing system having a contour-following rotating brush which can be fabricated at low cost, which utilizes readily available components, which is easy to fabricate or repair, and which can be manufactured at a comparatively low cost.

Still another object of the present invention is to provide a vehicle washing system having a contour-following rotating brush which reacts to an excessive vehicle to brush closure rate by deflecting itself within vertical and/or horizontal planes to a position which either minimizes or eliminates contact with the vehicle to avoid damage to either the vehicle or to the vehicle washing system regardless of whether the system is operating or is turned off.

Briefly stated, and in accord with one embodiment of the invention, a vehicle washing system includes a contour-following rotating brush for washing horizontal, vertical or inclined surfaces on a vehicle driven along a path located in proximity to the system. The system includes a brush assembly which incorporates a brush having a rotational axis and means for rotating the brush about the rotational axis. The brush assembly also includes a brush assembly pivot point which is located at an intermediate position along the length of the brush assembly. Brush assembly suspension means enables the brush assembly to be angularly deflected in both vertical and horizontal planes and includes a vertical support element positioned in proximity to the path and brush assembly standoff means which pivotally couples the brush assembly to the vertical support element at a predetermined elevation. The brush assembly standoff means includes horizontal pivot means and vertical pivot means. The horizontal pivot means pivotally couples a first section of the standoff means to the vertical support element to permit angular deflection of the standoff means with respect to the vertical support element in a substantially horizontal plane. The vertical pivot means is spaced apart from the horizontal pivot means and pivotally couples a second section of the standoff means to the brush assembly pivot point to permit angular deflection of the brush assembly with respect to the vertical support element within a substantially vertical plane. Due to a cooperative interrelationship of all of the elements of the invention, the rotational axis of the brush is deflected in both vertical and horizontal planes in response to relative movement between the vehicle and the system to maintain a firm but yieldable contact between the rotating brush and the vehicle.

DESCRIPTION OF THE DRAWINGS

The invention is pointed out with particularly in the appended claims. However, other objects and advantages together with the operation of the invention may be better understood by reference to the following detailed description taken in connection with the following illustrations, wherein:

FIG. 2 is a partially cutaway perspective view of the nose section of a diesel locomotive, particularly illustrating a number of vertically extending obstructions in the form of handrails.

FIG. 3 is an elevational view of the nose of a locomotive of the type depicted in FIGS. 1 and 2.

FIG. 4 is a partially cutaway perspective view of the various elements of the contour-following rotating brush of the present invention.

FIGS. 5A–5C depict various brush configurations which can be used in connection with the contour-following rotating brush system of the present invention.

FIGS. 7A–C represent views from above of the contour-following rotating brush of the present invention in the normal or at rest position (FIG. 7A), in an intermediate position where the brush rotational axis is partly deflected within both the horizontal and vertical planes (FIG. 7B), and in a third position where the brush rotational axis is fully deflected within the horizontal plane to permit the entire system to move out of the way of a locomotive or other vehicle travelling at an excessive speed (FIG. 7C).

FIGS. 8A–C represent a series of front elevational views of the contour-following rotating brush system of the present invention. In FIG. 8A, the brush rotational axis is in the normal or at rest position. In FIG. 8B, the brush rotational axis has been deflected vertically upward to permit the brush to either climb into or climb out of an area behind a vertical obstruction in the form of a locomotive handrail. FIG. 8C depicts the brush rotational axis in a fully upward deflected position which permits the brush to be deflected fully out of the way of a vehicle moving at an excessive rate of speed.

FIG. 9F depicts the system in a nonoperating configuration. FIG. 9G depicts the system in an initial stabilized operating configuration.

FIGS. 10A–G represent a sequential series of front elevational views which are time synchronized with each of the adjacent top elevational views depicted in FIG. 9.

FIGS. 14A–B represent partially cutaway perspective views of paired, overhead arm cleaning brushes depicted in FIG. 1 for cleaning selected side, front and back surfaces of each locomotive.

FIGS. 15A and 15C represent partially cutaway top and side elevational views of the first spray arch which applies chemicals and cleaning detergents to a locomotive as it passes through the vehicle washing system.

FIG. 15B represents a partially cutaway sectional view of the locomotive and spray arch depicted in FIG. 1, taken along section line 15B—15B of FIG. 1.

FIGS. 16A–E represent a series of time sequenced side elevational views of the spray arch depicted in FIGS. 1 and 15, particularly illustrating the bottom to top application of chemicals and detergents to the exterior surfaces of a locomotive.

FIG. 17 depicts protective equipment for preventing brush bristle entanglement with the rotating brush drive shaft.

FIGS. 18A–B depict another embodiment of the invention having an elongated brush.

FIGS. 19A–B depict the manner in which window brush 92 washes the upper horizontal surface of the locomotive nose.

DESCRIPTION OF THE PREFERRED EMBODIMENT

In order to better illustrate the advantages of the invention and its contributions to the art, a preferred hardware embodiment of the invention will now be described in detail.

Figure 1:
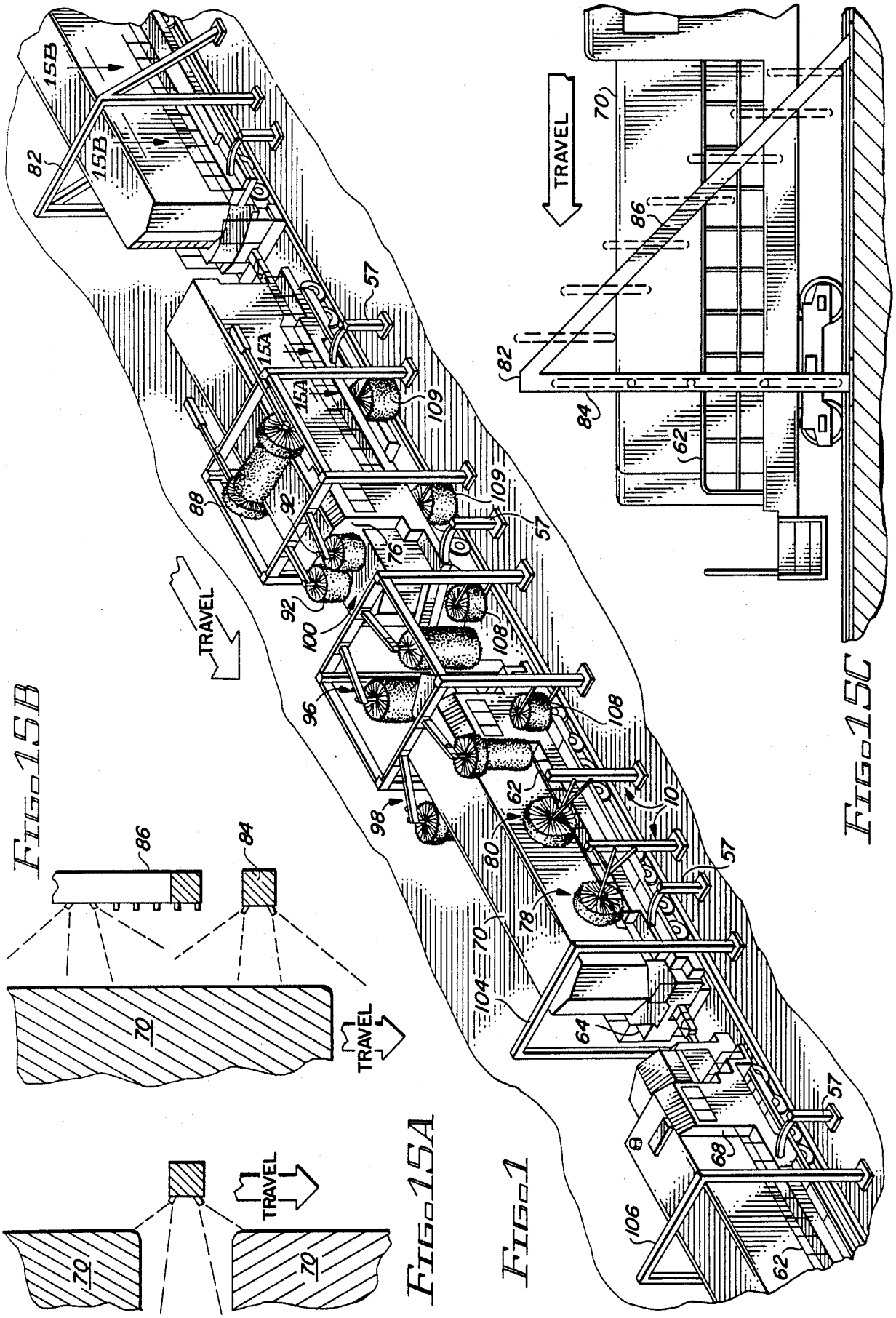
FIG. 1 is a perspective view of a plurality of interconnected locomotives travelling from right to left through an entire vehicle washing system including both contour-following rotating brushes as well as various other rotating brush elements for cleaning various different sections of the complex exterior surface structure of each locomotive.

Referring now to FIGS. 1-4, 6, 7 and 8, the multi-element vehicle washing system depicted in FIG. 1 includes a contour-following rotating brush system designated generally by reference number 10. System 10 includes a brush assembly designated generally by reference number 12 which includes a multi-strand vehicle washing brush 14 of a conventional design. The first end 16 of a brush shaft 18 is coupled to the centrally located rotational axis 20 of brush 14.

Brush rotating means in the form of an electric motor 22 and a gear box 24 divides brush assembly 12 into a first section 26 and a second section 28. A short gear box output shaft 30 couples gear box 24 through a flexible coupling 32 to brush shaft 18. Flexible coupling 32 is fabricated from a polyethylene plastic material and is similar to a larger flexible coupling device manufactured by N/S Corporation of Inglewood, Calif. for use in overhead arm vehicle washing systems of the type disclosed in U.S. Pat. No. 4,299,003. A Rex Omega flexible coupling may also serve as coupling 32 and may be purchased from Rexnord Elastomer Products Operation in New Berlin, Wis. Flexible coupling 32 absorbs shocks and compensates for misalignment between gearbox output shaft 30 and brush shaft 18.

A strut 36 extends from a brush assembly pivot point 34 to an intermediate location along brush shaft 18 between brush 14 and flexible coupling 32. Strut 36 includes a pair of spaced apart bearings which surround brush shaft 18 and maintain a fixed alignment between brush rotational axis 20 and gear box output shaft 30.

Figure 8A:
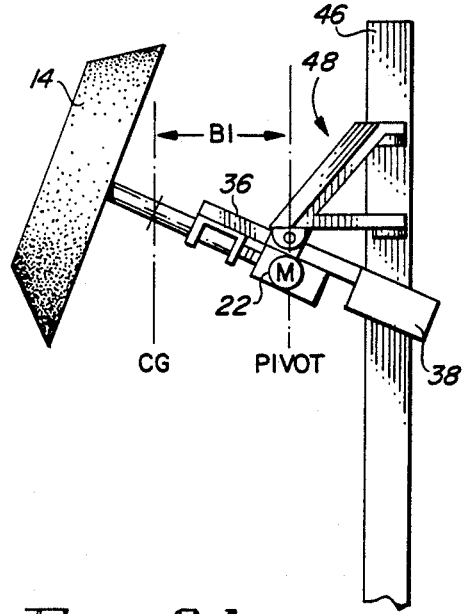
Figure 8B:
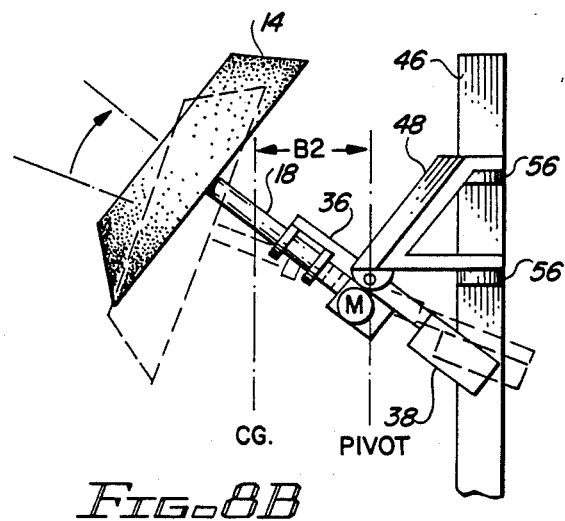

A counterweight 38 is secured to the end of second section 28 of brush assembly 12. As specifically illustrated in FIG. 4, counterweight 38 is frictionally coupled to brush assembly 12 to provide for movement either closer to or further away from brush assembly pivot point 34. As depicted in FIGS. 8A and 8B, the center of gravity of brush assembly 12 is located between brush 14 and brush assembly pivot point 34 to provide a downward biasing force to displace brush 14 toward a surface to be washed. Before brush to vehicle engagement, this downward biasing force rotates second section 28 of brush assembly 12 upward and causes a bumper 40 to engage a first limit means or stop 42. The relative location of brush assembly pivot point 34, the brush assembly center of gravity and counterweight 38 operates as vertical axis biasing means and serves to maintain a downward biasing force between brush 14 and the vehicle surface being washed to maintain a firm but yieldable contact between the rotating brush 14 and the vehicle surface in the vertical planes.

Brush assembly suspension means designated generally by reference number 44 provides for deflection of brush assembly 12 in both the vertical and horizontal planes and will be described in greater detail by referring to FIGS. 4, 6, 7 and 8.

Brush assembly suspension means 44 includes a vertical support element 46 which typically takes the form of a vertically oriented steel beam. Brush assembly standoff means 48 pivotally couples brush assembly 12 to vertical support element 46 and includes horizontal pivot means 50 and vertical pivot means 52. Horizontal pivot means 50 includes first and second spaced apart bearings 56 which form pivot means for pivotally coupling brush assembly standoff means 48 to vertical support element 46. As with the similar bearing structure depicted in FIG. 13, the pivot axis of paired bearings 56 is cocked or offset with respect to the vertical axis of vertical support element 46.

As depicted in FIG. 9F, the tilted or offset orientation of the pivot axis of horizontal pivot means 50 rotationally biases brush assembly standoff means 48 in a counterclockwise direction when viewed from above and serves as horizontal axis biasing means. In the non-operating configuration shown in FIG. 9F, the filaments of brush 14 drop down and brush 14 is displaced outward away from the adjacent rails by biasing means 50 and do not contact the sides of a passing locomotive. This fail safe brush positioning feature of the invention keeps brush system 10 physically spaced apart from locomotive traffic should brush motor 22 fail or an electrical power interruption occur. During maintenance operations, electrical power may be removed from motor 22 to prevent brush system 10 from being horizontally deflected into contact with passing locomotives.

FIG. 9G illustrates that actuation of motor 22 in response to deflection of sensing wand 57 by locomotive 70 energizes motor 22 to rotate brush 14 causing the limp brush bristles to extend and form a rotating cylindrical brushing surface. Aerodynamic interaction between the rotating brush 14 and the air produces a horizontally oriented force vector which overcomes the opposing biasing force and rotates brush assembly suspension means 44 clockwise to position brush 14 in the path of locomotive 7D.

Figure 7A:
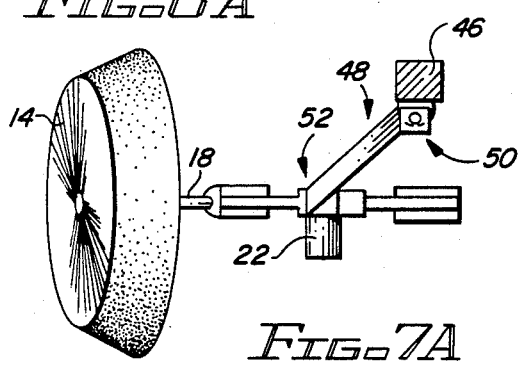

In an alternative embodiment of the invention, horizontal axis biasing means 50 can be configured to maintain brush assembly 12 in an outwardly biased position as depicted in FIG. 7A. Such a biasing arrangement maintains the brush in the path of locomotive 70 even when brush 14 is not rotating.

The manner in which the contour-following rotating brush of the present invention functions to wash either vertical, horizontal or inclined surfaces lying within an obstructed area will now be described in detail by referring to the locomotive washing system depicted in FIG. 1.

Modern diesel locomotives utilize vertically extending handrails designated by reference number 62 which typically surround virtually the entire circumference of the locomotive. Conventional vehicle washing brush systems cannot clean surfaces located behind vertical obstructions such as handrail 62. Conventional systems therefore cannot clean the horizontal walkway surfaces 64, the vertical side surfaces 66 or the vertical side surfaces 68 of locomotive 70.

Figure 9A:
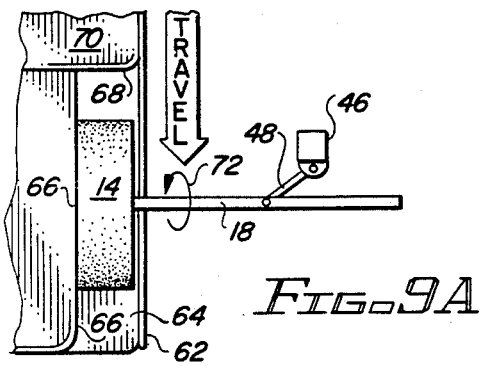
FIGS. 9A–E represent a sequential series of partially cutaway views from above depicting the contour-following rotating brush system of the present invention as it performs cleaning operations during the time a locomotive moves along a path adjacent to the system.

The manner in which the contour-following rotating brush system of the present invention accomplishes such difficult vehicle washing tasks will now be explained by referring to the synchronized series of views illustrated in FIGS. 9 and 10. FIG. 9 depicts the washing system and locomotive 70 from above while FIG. 10 represents a front end view of locomotive 70 and the washing system. As is the case throughout FIGS. 9 and 10, the views depicted in FIGS. 9A and 10A are synchronized in time and represent the same relative position of locomotive 70 and washing system 10.

As locomotive 70 moves relative to washing system 10, motor 22 and gear box 24 rotate brush 14 in a clockwise direction as indicated by the arrow designated by reference number 72. As best illustrated in FIG. 10A, the periphery of brush 14 contacts the upper horizontal surface of walkway 64. The relative rotation of brush 14 with respect to walkway 64 produces a reaction force which tends to rotate standoff means 48 in a clockwise direction when viewed from above. During the time interval depicted in FIGS. 9A and 10A, the horizontally oriented surface of walkway 64 is cleaned and clockwise rotation of brush assembly 12 is prevented by stop 60 as depicted in FIG. 4.

Figure 9B:
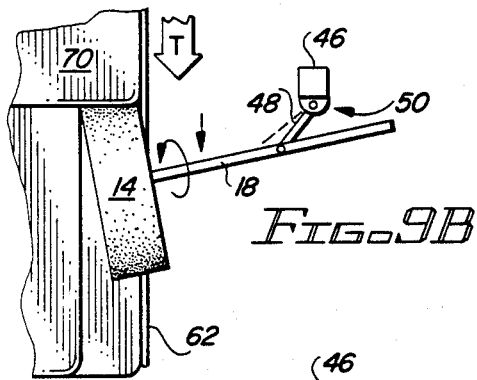
Figure 10A:
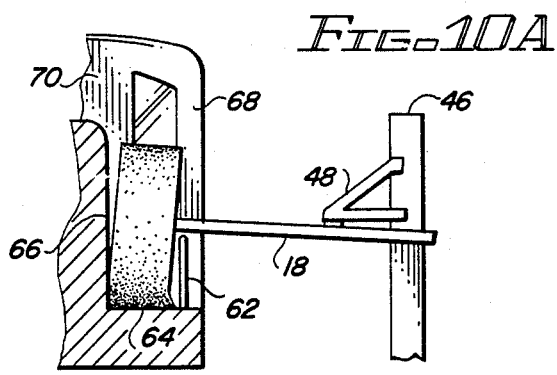
Figure 10B:
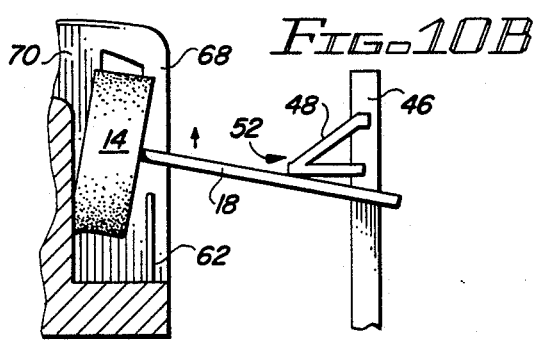
Figure 10C:
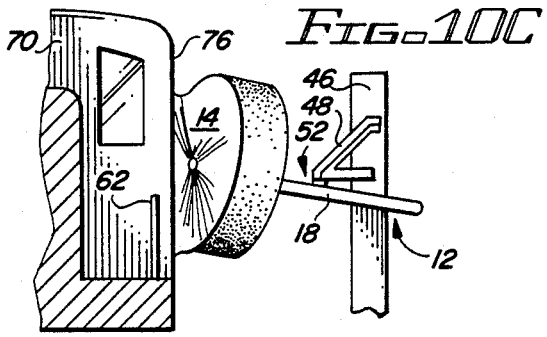
Figure 10D:
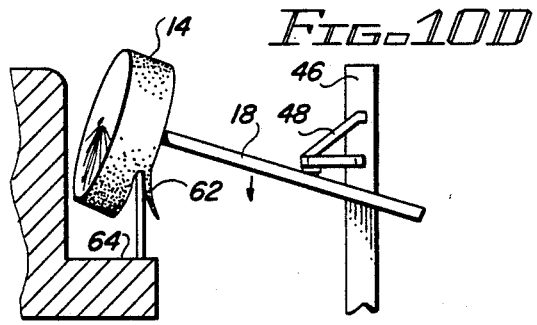
Figure 10E:
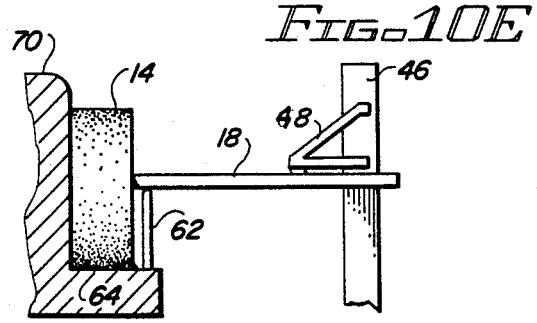

In FIGS. 9B and 10B, locomotive 70 has moved forward such that the periphery of rotating brush 14 contacts the vertically oriented surface 68 of the locomotive cab and creates a vertically oriented reaction force which deflects brush assembly 12 about vertical pivot means 52. As illustrated in FIG. 9B, the horizontal force vector imposed on brush 14 by the vertically oriented surface 68 of the locomotive cab has begun to pivot brush assembly standoff means 48 in a counterclockwise direction as indicated by the dotted line in FIG. 9B which represents the equilibrium position of brush assembly standoff means 48.

Figure 9C:
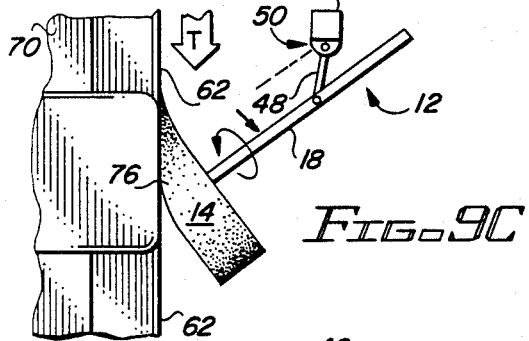

As illustrated in FIGS. 9C/10C, locomotive 70 has advanced further and brush 14 has climbed up and over handrail 62 and is washing the side of the cab 76. In this configuration, brush and brush shaft 18 has been deflected both upward within the vertical plane and laterally within the horizontal plane. The vertical component of the brush to locomotive force vector is insufficient to overcome the downward biasing force exerted on brush assembly 12 by the vertical axis biasing means, causing brush assembly 12 to be displaced vertically downward such that the circumference of brush 14 once again extends below the upper surface of handrail 62. As indicated by the dotted line in FIG. 9C, brush assembly standoff means 48 remains displaced in a counterclockwise direction from its resting position.

Figure 9D:
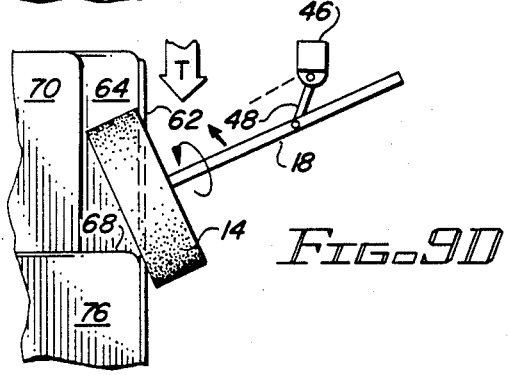

Referring now to FIGS. 9D/10D, locomotive cab 76 is about to pass beyond the washing range of system 10 as the periphery of brush 14 engages and walks up and over the top of handrail 62. The rotary reaction force between brush 14 and locomotive 70 displaces brush shaft 18 vertically upward as well as in a clockwise direction in the horizontal plane to return brush 14 to the desired position fully within walkway 64 to resume cleaning operations within this obstructed area. As brush 14 climbs within walkway area 64, it will contact and clean the rearward facing vertically oriented surface 68 of locomotive cab 76.

Figure 9E:
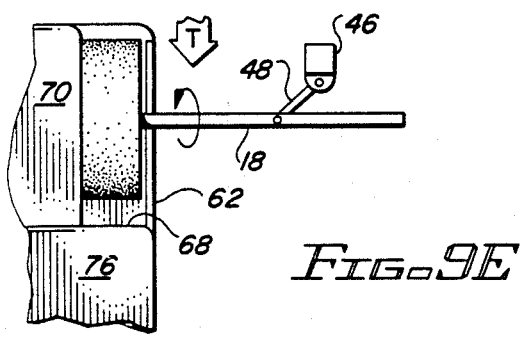

FIGS. 9E/10E depicts brush 14 and brush shaft 18 in positions analogous to those depicted in FIGS. 9A/10A. In this final configuration, the balance of walkway 64 is cleaned.

Figures 6A, 6B:
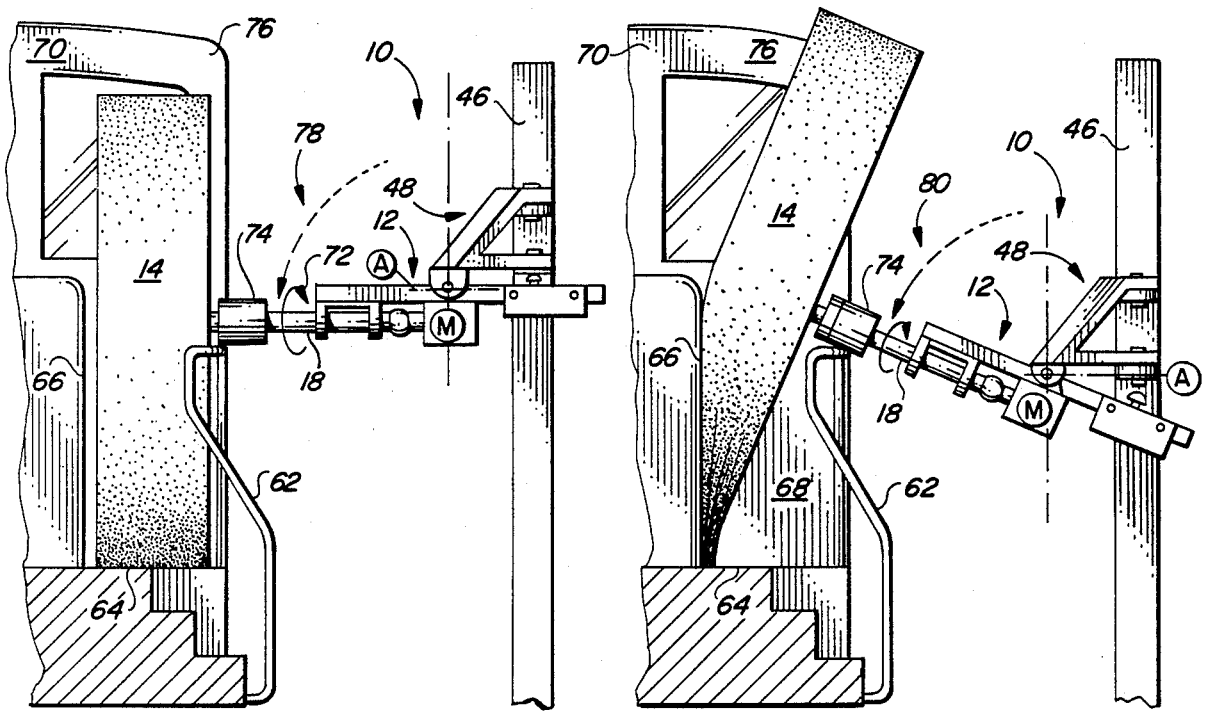
FIG. 6A represents a front elevational view of a first contour-following brush system of the present invention which permits the brush rotational axis to be deflected into a substantially horizontal plane for contacting and cleaning the horizontally oriented walkway surface and the front-facing vertically oriented cab surface located behind a vertically extending obstruction in the form of a handrail.
FIG. 6B represents a front elevational view of a second contour-following rotating brush system of the present invention mounted at a lower elevation and having a longer brush shaft where the rotational axis of the brush is deflected to contact a vertically extending locomotive surface lying behind a vertically extending obstruction in the form of a locomotive handrail.

The operation of the system depicted in FIGS. 9 and 10 corresponds to the first brush system designated in FIG. 1 by reference number 78. FIG. 6A further illustrates first brush system 78. This first brush system is configured to orient brush assembly 12 in a substantially horizontal position permitting the periphery of brush 14 to clean the horizontally oriented upper surface of walkway 64. As illustrated in FIG. 6A and 6B and FIG. 4, the circumference of brush shaft 18 may directly contact the upper surface of handrail 62. To prevent excessive wear on this section of brush shaft 18, a metal or plastic cylindrical sleeve 74 is slipped over brush shaft 18.

The second brush system designated in FIG. 1 by reference number 80 is illustrated greater detail in FIG. 6B. Brush assembly standoff means 48 is coupled at a different elevation to vertical support element 46 and other elements of system 10 are reconfigured to cause the periphery of brush 14 to contact the vertically oriented side surface 66 of locomotive 70 with only minimal contact between brush 14 and horizontally oriented walkway 64. Once again, brush system 80 operates to clean a surface positioned within an obstructed area created by a vertically extending obstruction in the form of handrail 62. Except for the differences described above, second brush system 80 operates in a manner substantially identical to that described in connection with the description of brush system 78 as sequentially depicted in FIGS. 9/10.

Figure 7B:
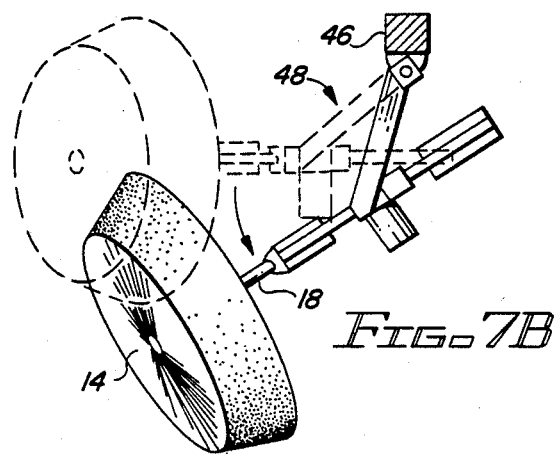

FIGS. 7A-C depict the contour-following rotating brush system of the present invention at rest (FIG. 7A), partially deflected within the horizontal and vertical planes as a result of rotation of brush assembly standoff means 48 with respect to horizontal pivot means 50 and rotation of brush assembly 12 with respect to vertical pivot means 52 (FIG. 7B), and full horizontal deflection of brush assembly standoff means 48 (FIG. 7C). The full horizontal deflection configuration of the present invention depicted in FIG. 7C is not a normal configuration, but may be achieved as a result of an excessive closure velocity between locomotive 70 and the system of the present invention. In FIG. 7C, the entire brush assembly 12 has been deflected through a substantial angle such that it virtually clears the side of locomotive 70 to eliminate the possibility of damage to any element of the system which might otherwise be caused by such an excessive closure rate.

FIGS. 8A-C depict the invention in an equilibrium (nonvertically deflected) configuration (FIG. 8A), in a partially vertically deflected configuration (FIG. 8B), and in a fully deflected configuration where the entire brush assembly essentially clears locomotive 70 (FIG. 8C). The FIG. 8C configuration is not normal, but could result from an excessive closure rate between locomotive 70 and the system 10 or as a result of other non-standard conditions.

As illustrated in FIGS. 5A-C, brush 14 may be configured as a cylinder, as a plurality of different fixed length brush elements, or as a conical section. Slightly different performance will be realized with each different brush configuration.

As described above, the unique configuration of the present invention permits rotational axis 20 of brush 14 to be freely and independently deflected in both vertical and horizontal planes in response to relative movement between a vehicle and the system of the present invention. Horizontal axis biasing means and vertical axis biasing means are provided to maintain a firm but yieldable contact between rotating brush 14 and the moving surfaces of the vehicle being washed. The brush to vehicle engagement force can be controlled by varying a number of parameters. For example, the degree of either clockwise or counterclockwise horizontal axis biasing force exerted through horizontal pivot means 50 can be controlled by varying the offset between the pivot axis of pivot means 50 and true vertical. In an alternative embodiment of the present invention, a spring or a cable, weight and pulley biasing system could be coupled to brush assembly standoff means 48 to provide the required magnitude and direction of horizontal axis biasing force. The magnitude of the vertical biasing force can be controlled by varying the position of counterweight 38 or by otherwise reconfiguring the weight and balance of brush assembly 12. Springs or other equivalent biasing devices could also be coupled to vertical pivot means 52 to provide similar downward bias forces on brush 14.

By utilizing the unique combination of elements described above, a contour-following rotating brush washing system has been created without relying upon active control systems to maintain a desired positional relationship between a rotating brush and the various vertical, horizontal or inclined surfaces of a vehicle. Instead, the invention utilizes (1) the reaction force produced by a rotating brush on vehicle surfaces, (2) gravity induced forces, (3) aerodynamic forces, and (4) the relative movement of a vehicle with respect to a stationary vehicle washing system. The specific structural configuration of the present invention creates a unique interrelationship with the brush reaction force, gravity, aerodynamic forces and relative vehicle to system movement to automatically wash surfaces positioned either in alignment with or on the opposite side of a vertically extending obstruction such as a handrail. This same system will function to position a contour-following rotating brush adjacent to other obstructed surfaces positioned either in alignment with or on the opposite side of a vertically extending surface. A more generalized example of such other applications of the contour-following rotating vehicle brush system includes the application of washing the bed of a pickup truck as well as other related applications which would be readily apparent to a person of ordinary skill in the art.

As illustrated in FIG. 1, the overall vehicle washing system of the present invention includes several other elements for applying chemicals and detergents to a vehicle, for rinsing that vehicle, and for washing various other vehicle surfaces which do not reside on the opposite side of a vertically extending obstruction. Each of these various additional elements of the present invention will now be described in detail.

Referring now to FIG. 1, a series of locomotives 70 first encounter a chemical spray arch 82 which is depicted in greater detail in FIGS. 15A-C and in FIGS. 16A-E. Arch 82 includes a first vertically oriented spray element 84 and a second inclined spray element 86. FIGS. 15A-C generally illustrate the spray pattern of the nozzles positioned on the interior surface of spray arch 82. FIG. 16E indicates the positioning of a number of spray nozzles on the upper element of spray arch 82. These nozzles direct a downward spray with either a forward or rearward spray orientation onto locomotive 70.

As illustrated in FIGS. 16A-16D, spray nozzle number 1 on inclined spray element 86 initially discharges chemical and detergent materials onto the lower section of locomotive 70. As locomotive 70 travels toward the vehicle washing system, spray nozzles 2-7 sequentially discharge chemical detergent materials at increasing vertical elevations onto the side surfaces of locomotive 70. This "bottom up" discharge of chemical spray onto the side of the locomotive permits the chemical detergent material to operate on dirt, grease and grime for a longer time at lower parts of the locomotive sides so that chemical material subsequently discharged at higher elevations can run down over areas sprayed at a slightly earlier time. This bottom up spray pattern permits the sprayed-on chemicals to operate for a longer period of time on the lower locomotive surfaces and has achieved enhanced cleaning action by inducing dirt slides analogous to those caused by a massive failure of a water reservoir dam.

Figure 12:
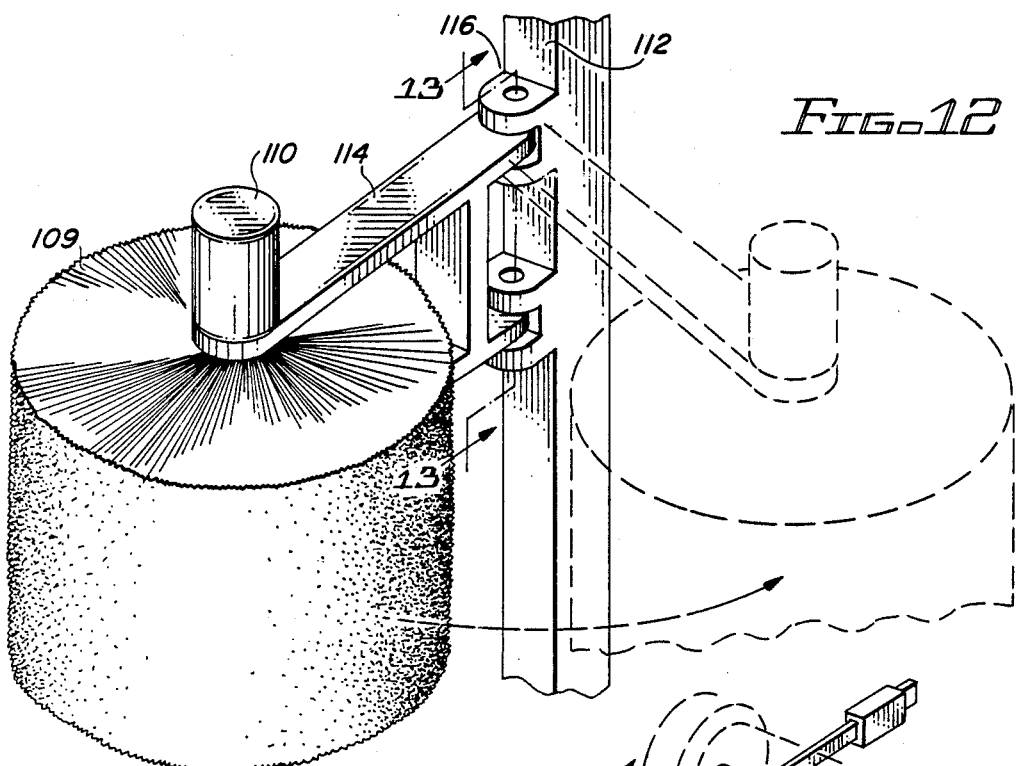
FIG. 12 represents a partially cutaway perspective view of a rotating brush cleaning system depicted in FIG. 1 which cleans various lower parts of the sides of each locomotive.
Figures 11, 13:
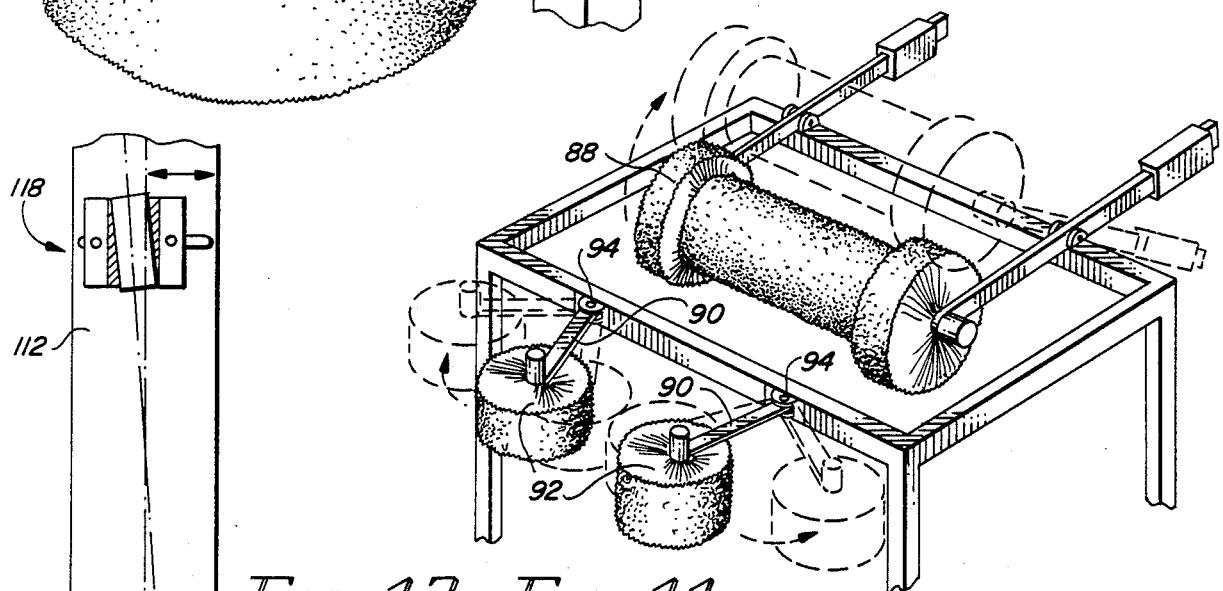
FIG. 11 represents a partially cutaway perspective view of structure illustrated in FIG. 1 for cleaning selected upper sections of each locomotive.
FIG. 13 is a partially cutaway sectional view of the pivot coupling depicted in FIG. 12 which pivotally couples a rotating brush with a vertical support element, taken along section line 13—13 of FIG. 12.

Referring now to FIGS. 1, 12 and 13, a plurality of side brushes 108 and truck brushes 109 are provided to wash the locomotive trucks and various higher elevation side surfaces of locomotive 70. Each brush of brush systems 108 and 109 is driven by a motor 110 and is supported by a vertical support member 112. A bracket 114 pivotally couples brushes 108 and 109 and drive motor 110 to vertical support element 112. Pivotal coupling means 116 of a type analogous to pivotal coupling means 50 described above pivotally couples brushes 108 and 109 to vertical support member 112 while simultaneously biasing brushes 108 and 109 inward into a position essentially perpendicular to the path to be travelled by the locomotives. As illustrated in FIG. 13, bearings 118 are cocked with respect to each other as described above to provide a self-closing biasing force to maintain bracket 114 essentially perpendicular to the locomotive path. Horizontally oriented, oval apertures 120 are provided in the vertical face of vertical support member 112 to adjust the relative offset between the upper and lower bearing to adjust the magnitude of this inward biasing force. As illustrated in FIG. 12, bracket 114 may be readily rotated in a clockwise direction from the normal or resting position depicted in solid lines into the deflected position depicted in dotted lines.

Brushes 108 and 109 can be rotated in either clockwise or counterclockwise directions. Optimal cleaning results are achieved when each brush 108 and 109 of the longitudinally staggered, paired brush sets 108 and 109 rotate in opposite directions. With such opposing brush rotation, one brush cleans the forward facing and side facing locomotive surfaces while the other brush cleans the side facing and rear facing surfaces. A substantially greater outward horizontal biasing force will be required for the forward facing surface cleaning brush than for the rear facing surface cleaning brush and may require supplemental biasing force from an auxiliary biasing spring or equivalent device.

Except for top roller unit 88, every system brush is configured as one of a pair of staggered brushes. This redundant configuration not only achieves superior two pass surface cleaning, but also enables one brush of each pair to be shut down for periodic maintenance or repairs without rendering the entire locomotive washing system inoperative.

Referring now to FIGS. 1 and 11, a counterbalanced, motor-driven top roller unit 88 engages and cleans the upper surfaces of locomotives 70. The maximum downward deflection of the shaft of the horizontally oriented brush is limited so that the centrally located, rigid brush shaft will not contact the upper surface of locomotive 70. Failure of this brush to rotate will not cause damage inducing contact between the rigid brush shaft and locomotive 70. This configuration renders the system fail safe. This unit is of a conventional design and is well known to those of ordinary skill in the art.

On the same supporting frame, a pair of pivotally coupled arms 90, support short length, vertically oriented window brushes 92 which engage and wash the high elevation vertical surfaces of locomotive cab 76 as well as horizontal surface 100. A flexible coupling the same as flexible coupling 102 depicted in FIG. 14B couples brush 92 to brush support arm 90.

The length of the shaft of window brush 92 is dimensioned to be in proximity to the horizontal surface of nose 100 of locomotive 70. As brush 92 rotates, the outer periphery of the brush bristles positioned along the lower section of brush 92 droop down as depicted in FIGS. 19A and B and create a rotating brushing engagement with the horizontal surface of nose 100 to completely clean that entire surface as locomotive 70 moves with respect to brush 92. As illustrated in FIGS. 19A and B, the lower tip 93 of the shaft of brush 92 may be positioned either above or below the horizontal surface of nose 100. When tip 93 is positioned below the horizontal surface of nose 100A as depicted in FIG. 19A, flexible coupling 102 permits brush 92 to deflect and clean the horizontal surface of nose 100A. Brush shaft tip 93 may be covered with plastic or other soft material such as Teflon to avoid marring the finish on the horizontal surface of nose 100A. When brush shaft tip 93 is positioned above the horizontal surface of nose 100B as depicted in FIG. 19B, cleaning will occur as long as the drooping brush bristles maintain contact with nose 100B. Cleaning of the horizontal surface of nose 100B will not occur in the FIG. 20B embodiment if the spacing between brush shaft tip 93 and nose 100B exceeds the bristle length. This feature of the invention enables brush 92 to accommodate a variety of locomotive designs with significant variations in the elevation of the horizontal surface of nose 100.

Arms 90 are coupled to the supporting frame by a pivot coupling devices 94 which are located overhead and inside the path travelled by the vehicle to be washed. Similar brush systems of this general type are disclosed and claimed in U.S. Pat. Nos. 4,225,995 and 4,299,003 assigned to N/S Corporation of Inglewood, Calif. These patents are hereby incorporated by reference. Similar brush systems are positioned downstream on the vehicle washing system as indicated in FIG. 1 by reference numbers 96 and 98. Nose brush systems 96 and 98 are essentially identical to window brush system 92 except for overall brush length. Each of these brushes is rotated in a direction which causes the brush to engage and walk outward along the front surface of the vehicle due to the reactive force between each rotating brush and the vehicle surface. This unique brush suspension system and configuration permits a single brush to wash the front, side and rear surfaces of a selected part of the vehicle. Since the vertical dimension of brushes 96 and 98 causes them to contact and walk around the vertically extending sides of locomotive nose 100, neither of these sets of brushes is capable of washing the higher vertically extending exterior front surfaces of locomotive cab 76 residing behind locomotive nose 100. For that reason, a pair of short length window brushes 92 are provided specifically to clean this difficult to access area of locomotive 70.

Figure 14A:
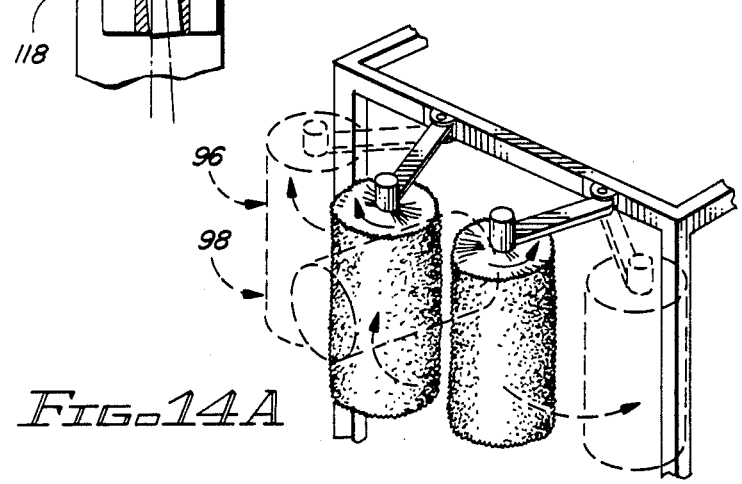

As illustrated in FIGS. 14A and 14B and as described in the patents cited above, the flexible coupling 102 which interconnects the rotating brushes with the overhead arms in systems 92, 96 and 98 permits the brushes to be deflected upward to a nearly horizontal position if the brushes are positioned in the equilibrium position depicted in FIGS. 14A and 14B and are contacted by a locomotive moving at an excessive speed. This safety feature prevents system and locomotive damage as a result of excessive vehicle speed.

Referring once again to FIG. 1, locomotive 70 next encounters a flood rinse arch 104 which discharges recycled water against the locomotive to remove dirt and chemicals. Subsequently the locomotive encounters a high pressure rinse arch 106 which sprays fresh water on the locomotive.

FIG. 17 illustrates that a semi-rigid rubber or plastic disc 122 is coupled to the inboard side of brush 14 and that a semi-cylindrical hood or shield 124 prevents the limp filaments of brush 14 from falling down on and becoming entangled in brush shaft 18 as the bristles of brush 14 extend when starting or collapse when stopping.

FIGS. 18A and B illustrate a contour-following vehicle washing brush system which utilizes an elongated cylindrical brush 14 for washing the curved upper corner surfaces of a railroad passenger car 126 or the hood, windshield and top of an automobile 128.

Numerous combinations and permutations of the various disclosed interrelated items of vehicle washing equipment may be made without departing from the scope of the present invention. For example, each of the various wash systems of the present invention as described above could be repositioned in a different sequence without substantially degrading the overall performance of the present invention. The direction of rotation of brush 14 may be reversed and brush assembly 12 biased toward locomotive 70 by horizontal axis biasing means. Although such a brush rotation direction is not preferred over opposite rotation direction, the contour following vehicle washing brush system still operates to deflect the brush in both horizontal and vertical planes to wash obstructed surfaces. Numerous other such changes would be obvious to a person of ordinary skill in the art. Accordingly, it is intended by the appended claims to cover all such modifications of the invention which fall within the true spirit and scope of the invention.

We claim:

1. A vehicle washing system including a contour-following rotating brush for washing horizontal, vertical or inclined surfaces on a vehicle driven along a path located in proximity to said system, said system comprising:
    a. a brush assembly having a length and including
        i. a brush having a rotational axis;
        ii. means for rotating said brush about the rotational axis;
        iii. a brush assembly pivot point located at an intermediate position along the length of said brush assembly;
    b. brush assembly suspension means for enabling said brush assembly to be angularly deflected in both vertical and horizontal planes, including
        i. a vertical support element positioned in proximity to said path;
        ii. brush assembly standoff means for pivotally coupling said brush assembly to said vertical support element at a predetermined elevation, including
            A. horizontal pivot means for pivotally coupling a first section of said standoff means to said vertical support element to permit angular deflection of said standoff means with respect to said vertical support element in a substantially horizontal plane;
            B. vertical pivot means spaced apart from said horizontal pivot means for pivotally coupling a second section of said standoff means to said brush assembly pivot point to permit angular deflection of said brush assembly with respect to said vertical support element within a substantially vertical plane;
            C. horizontal axis biasing means for biasing said horizontal pivot means and said brush assembly away from the path of said vehicle;
            D. Vertical axis biasing means for biasing said vertical pivot means and said brush assembly downward to maintain contact between said rotating brush and said vehicle; and c. said brush rotating means rotating said brush in a direction which produces a reaction force between said brush and a vertical surface of said vehicle such that the brush to vehicle surface reaction force opposes the downward biasing force of said vertical axis biasing means and causes upward deflection of the brush rotational axis as said vertical vehicle surface engages said brush;

whereby the rotational axis of said brush is deflected in both the vertical and horizontal planes in response to relative movement between said vehicle and said system to maintain a firm but yieldable contact between said rotating brush and said vehicle.

2. The vehicle washing system of claim 1 wherein the center of gravity of said brush assembly is located on a first side of said brush assembly lying between said brush and said brush assembly pivot point and exerts a downward torque force on said brush.

3. The vehicle washing system of claim 2 wherein said brush assembly includes a second side extending beyond said pivot point and away from said first side of said brush assembly.

4. The vehicle washing system of claim 3 wherein said vertical axis biasing means includes third biasing means coupled to the second side of said brush assembly for exerting an upward torque force on said brush.

5. The vehicle washing system of claim 4 wherein said vertical axis biasing means includes means for varying the spacing between said pivot point and said third biasing means to vary the magnitude of the upward torque force on said brush.

6. The vehicle washing system of claim 4 wherein said vertical pivot means includes first means for limiting the maximum downward deflection of said brush assembly about said pivot point to thereby limit the maximum downward displacement of said brush.

7. The vehicle washing system of claim 6 wherein said first limit means includes a stop coupled to said brush assembly standoff means for engaging the second side of said brush assembly at a predetermined elevation to limit the maximum upward deflection of the second side of said brush assembly.

8. The vehicle washing system of claim 6 wherein said horizontal pivot means includes second limit means for limiting the maximum angular deflection of said brush assembly toward said path.

9. The vehicle washing system of claim 1 wherein said brush assembly standoff means maintains a substantially fixed spacing between said horizontal axis biasing means and said vertical axis biasing means.

10. The vehicle washing system of claim 9 wherein the first section of said brush assembly standoff means is coupled to said brush assembly standoff means by pivot means having an axis of rotation.

11. The vehicle washing system of claim 10 wherein said horizontal axis biasing means is provided by offsetting the axis of rotation of said pivot means from the vertical.

12. The vehicle washing system of claim 1 wherein said brush rotation means includes a motor having an output shaft coupled to a gear box coupled to rotate said brush.

13. The vehicle washing system of claim 12 wherein said brush assembly pivot point is coupled to said gear box.

14. The vehicle washing system of claim 12 wherein said brush rotating means includes a brush shaft having a first end coupled to the rotational axis of said brush and a second end.

15. The vehicle washing system of claim 14 wherein the output of said gear box is coupled to the second end of said brush shaft by a flexible coupling.

16. The vehicle washing system of claim 1 wherein said brush includes tapered sides.

* * * * *